(12) United States Patent
Raviv et al.

(10) Patent No.: US 11,138,265 B2
(45) Date of Patent: Oct. 5, 2021

(54) COMPUTERIZED SYSTEM AND METHOD FOR DISPLAY OF MODIFIED MACHINE-GENERATED MESSAGES

(71) Applicant: VERIZON MEDIA INC., New York, NY (US)

(72) Inventors: Ariel Raviv, Haifa (IL); Irena Grabovitch-Zuyev, Haifa (IL); Joel Oren, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 121 days.

(21) Appl. No.: 16/272,118

(22) Filed: Feb. 11, 2019

(65) Prior Publication Data
US 2020/0257726 A1   Aug. 13, 2020

(51) Int. Cl.
*G06F 16/83*   (2019.01)
*H04L 12/58*   (2006.01)
*G06F 16/34*   (2019.01)

(52) U.S. Cl.
CPC ............. *G06F 16/83* (2019.01); *G06F 16/34* (2019.01); *H04L 51/22* (2013.01)

(58) Field of Classification Search
CPC .......... G06F 16/83; G06F 16/34; G06F 16/30; G06F 16/80; H04L 51/22; H04L 51/063; H04L 51/066
See application file for complete search history.

(56) References Cited

U.S. PATENT DOCUMENTS

| | | | | |
|---|---|---|---|---|
| 5,734,903 | A * | 3/1998 | Saulpaugh | G06F 9/465 709/238 |
| 6,356,633 | B1 * | 3/2002 | Armstrong | H04L 51/14 379/265.04 |
| 6,600,750 | B1 * | 7/2003 | Joffe | H04L 51/066 358/1.15 |
| 6,625,142 | B1 * | 9/2003 | Joffe | H04L 51/066 370/356 |
| 6,718,516 | B1 * | 4/2004 | Claussen | G06F 16/986 715/234 |
| 6,820,237 | B1 * | 11/2004 | Abu-Hakima | G06F 40/117 715/210 |
| 6,976,211 | B2 * | 12/2005 | Lection | G06F 21/6209 707/999.009 |

(Continued)

FOREIGN PATENT DOCUMENTS

CN   104881488 A   9/2015

*Primary Examiner* — Jung-Mu T Chuang
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a universally applied framework for analyzing all forms and types of messages being communicated over network, and providing functionality to an inbox for alerting a user to specific forms or types of content included within received and displayed messages. Such functionality can include determining and displaying specific message content in a modified manner when its associated message is displayed from a message inbox. The messages can be modified upon display within in the inbox to indicate and identify that the message includes content of a specific type or form.

16 Claims, 7 Drawing Sheets

(56) References Cited

U.S. PATENT DOCUMENTS

| | | | |
|---|---|---|---|
| 7,086,042 B2* | 8/2006 | Abe | G06F 40/14 717/143 |
| 7,131,066 B1* | 10/2006 | Birsan | G06F 16/84 715/206 |
| 7,140,536 B2* | 11/2006 | Barabe | G06F 40/166 235/375 |
| 7,392,289 B2* | 6/2008 | Curry | G06Q 10/107 709/203 |
| 7,451,099 B2* | 11/2008 | Henkin | G06Q 30/02 705/14.54 |
| 7,752,224 B2* | 7/2010 | Davis | G06F 16/80 707/793 |
| 7,925,993 B2* | 4/2011 | Williams | G06F 3/04842 715/821 |
| 7,949,720 B2* | 5/2011 | Vernal | G06F 9/465 709/207 |
| 7,966,623 B2* | 6/2011 | Chandra | G06F 16/986 719/328 |
| 8,005,825 B1* | 8/2011 | Ghosh | G06F 16/334 707/723 |
| 8,108,763 B2* | 1/2012 | Gao | H04L 51/046 715/209 |
| 8,117,238 B2* | 2/2012 | Yuan | G06F 16/9577 707/803 |
| 8,145,716 B2* | 3/2012 | Karamchedu | G06Q 10/107 709/206 |
| 8,166,117 B2* | 4/2012 | Sundstrom | G06F 40/126 709/206 |
| 8,185,524 B2* | 5/2012 | Weber | G06F 16/3334 707/724 |
| 8,230,384 B1* | 7/2012 | Krishnan | G06F 16/11 717/100 |
| 8,300,776 B2* | 10/2012 | Davies | G10L 15/22 379/88.11 |
| 8,312,093 B2* | 11/2012 | Brown | H04L 65/605 709/206 |
| 8,316,315 B2* | 11/2012 | Portnoy | G06Q 10/107 715/772 |
| 8,352,552 B2* | 1/2013 | Kaghazian | G06Q 10/107 709/206 |
| 8,352,573 B2* | 1/2013 | Chandra | H04N 1/32144 709/218 |
| 8,412,695 B2* | 4/2013 | Bhide | G06F 16/951 707/706 |
| 8,438,080 B1* | 5/2013 | Xiao | G06Q 30/0201 705/27.1 |
| 8,495,503 B2* | 7/2013 | Brown | H04L 67/36 715/752 |
| 8,499,048 B2* | 7/2013 | Malik | H04L 51/22 709/206 |
| 8,549,171 B2* | 10/2013 | Ramarao | H04L 69/08 709/238 |
| 8,554,586 B2* | 10/2013 | Barth | G06Q 10/06313 705/4 |
| 8,655,731 B2* | 2/2014 | Bosarge | G06Q 30/0271 705/14.73 |
| 8,844,010 B2* | 9/2014 | Brady | G06Q 30/0601 726/7 |
| 8,898,296 B2* | 11/2014 | Zeng | G06F 16/951 709/224 |
| 8,910,060 B2* | 12/2014 | Chandra | G06F 16/9562 715/760 |
| 8,954,510 B2* | 2/2015 | Chen | H04L 51/08 709/206 |
| 8,984,081 B2* | 3/2015 | Malik | G06Q 10/00 709/206 |
| 8,996,654 B2* | 3/2015 | Polis | H04L 67/00 709/217 |
| 9,049,222 B1* | 6/2015 | He | H04L 63/1425 |
| 9,049,258 B2* | 6/2015 | Prats | G06F 3/04842 |
| 9,135,363 B2* | 9/2015 | Chow | G06F 21/10 |
| 9,430,583 B1* | 8/2016 | Flake | G06F 16/9577 |
| 9,436,932 B2* | 9/2016 | Guy | H04L 51/32 |
| 9,460,292 B2* | 10/2016 | Walters | G06F 21/60 |
| 9,524,531 B2* | 12/2016 | Byrne | G06Q 50/32 |
| 9,535,900 B2* | 1/2017 | Galvin, Jr. | G06F 40/30 |
| 9,600,807 B2* | 3/2017 | Chavan | G06Q 10/107 |
| 9,686,216 B2* | 6/2017 | Hammer | G06Q 10/107 |
| 9,705,833 B2* | 7/2017 | Pyla | G06Q 10/107 |
| 9,723,460 B1* | 8/2017 | Onyon | H04W 4/12 |
| 9,756,000 B1* | 9/2017 | Paulramachandran | H04L 51/28 |
| 9,787,714 B2* | 10/2017 | Bach | H04L 63/1483 |
| 9,898,255 B2* | 2/2018 | Osterhoff | G06F 8/20 |
| 9,984,428 B2* | 5/2018 | Doyle | G06F 16/34 |
| 10,073,926 B2* | 9/2018 | Bastide | H04L 51/16 |
| 10,140,291 B2* | 11/2018 | Brunn | G06F 40/279 |
| 10,191,975 B1* | 1/2019 | Eisenberg | G06F 40/205 |
| 10,269,048 B2* | 4/2019 | Stergiou | G06Q 30/0277 |
| 10,346,455 B2* | 7/2019 | Sadovsky | G06N 20/00 |
| 10,353,994 B2* | 7/2019 | Upadhyay | H04L 51/16 |
| 10,372,672 B2* | 8/2019 | Amarendran | G06F 16/93 |
| 10,387,550 B2* | 8/2019 | Simske | G06F 16/334 |
| 10,387,892 B2* | 8/2019 | Rezaei | G06Q 10/10 |
| 10,412,029 B2* | 9/2019 | Friend | G06F 40/205 |
| 10,419,568 B2* | 9/2019 | Rubtsov | H04L 67/34 |
| 10,547,734 B2* | 1/2020 | Togwe | H04L 51/20 |
| 10,608,971 B2* | 3/2020 | Rivelli | H04L 51/063 |
| 10,637,947 B2* | 4/2020 | Walkin | H04L 67/26 |
| 10,642,936 B2* | 5/2020 | Arquero | G06Q 10/107 |
| 2001/0054049 A1* | 12/2001 | Maeda | G06F 16/9577 715/236 |
| 2002/0078158 A1* | 6/2002 | Brown | H04L 65/605 709/206 |
| 2002/0120505 A1* | 8/2002 | Henkin | G06Q 30/02 705/14.69 |
| 2002/0184264 A1* | 12/2002 | Berg | G06F 16/84 715/205 |
| 2003/0018624 A1* | 1/2003 | Hsiao | G06F 16/134 |
| 2003/0018898 A1* | 1/2003 | Lection | G06F 21/6209 713/182 |
| 2003/0063128 A1* | 4/2003 | Salmimaa | G06F 3/04817 715/810 |
| 2003/0191689 A1* | 10/2003 | Bosarge | G06Q 30/0271 705/14.35 |
| 2003/0200272 A1* | 10/2003 | Campise | H04L 51/28 709/206 |
| 2003/0200502 A1* | 10/2003 | Abe | G06F 40/14 715/210 |
| 2003/0229854 A1* | 12/2003 | Lemay | G06F 16/345 715/227 |
| 2004/0001090 A1* | 1/2004 | Brown | G06Q 10/107 715/752 |
| 2004/0044674 A1* | 3/2004 | Mohammadioun | G06Q 10/10 |
| 2004/0157582 A1* | 8/2004 | Peglion | H04W 8/12 455/403 |
| 2005/0027781 A1* | 2/2005 | Curry | G06Q 10/107 709/200 |
| 2005/0251692 A1* | 11/2005 | Motoyama | G06Q 10/107 713/189 |
| 2006/0092920 A1* | 5/2006 | Karamchedu | G06Q 10/107 370/352 |
| 2006/0123425 A1* | 6/2006 | Ramarao | G06F 9/546 719/313 |
| 2006/0136821 A1* | 6/2006 | Barabe | G06F 40/197 715/205 |
| 2006/0194595 A1* | 8/2006 | Myllynen | H04L 51/063 455/466 |
| 2006/0195413 A1* | 8/2006 | Davis | G06F 16/93 |
| 2006/0195785 A1* | 8/2006 | Portnoy | G06Q 10/107 715/700 |
| 2006/0269148 A1* | 11/2006 | Farber | G06Q 40/00 382/232 |
| 2007/0016647 A1* | 1/2007 | Gupta | G06Q 10/107 709/206 |
| 2007/0027954 A1* | 2/2007 | Chen | H04L 51/08 709/206 |
| 2007/0150387 A1* | 6/2007 | Seubert | G06Q 40/00 705/31 |

(56) References Cited

U.S. PATENT DOCUMENTS

| | | | |
|---|---|---|---|
| 2007/0180043 A1* | 8/2007 | Vernal | H04L 69/16 709/207 |
| 2007/0234209 A1* | 10/2007 | Williams | G06F 40/169 715/700 |
| 2008/0005751 A1* | 1/2008 | Chandra | G06F 16/986 719/328 |
| 2008/0016091 A1* | 1/2008 | Chandra | G06F 40/14 |
| 2008/0016164 A1* | 1/2008 | Chandra | H04N 1/32144 709/206 |
| 2008/0016169 A1* | 1/2008 | Kaghazian | G06F 3/01 709/206 |
| 2008/0034049 A1* | 2/2008 | Stokes | G06Q 10/107 709/206 |
| 2008/0091784 A1* | 4/2008 | Sundstrom | G06F 40/126 709/206 |
| 2008/0092085 A1* | 4/2008 | Yuan | G06F 40/114 715/854 |
| 2008/0154912 A1* | 6/2008 | Weber | G06F 16/3334 |
| 2008/0178073 A1* | 7/2008 | Gao | G06F 40/103 715/243 |
| 2008/0195664 A1* | 8/2008 | Maharajh | H04L 67/306 |
| 2008/0195932 A1* | 8/2008 | Oikawa | G06F 16/972 715/234 |
| 2008/0222257 A1* | 9/2008 | Mukherjee | G06Q 10/107 709/206 |
| 2008/0275873 A1* | 11/2008 | Bosarge | G06Q 30/0267 |
| 2009/0019064 A1* | 1/2009 | Takafuji | G06F 40/143 |
| 2009/0125529 A1* | 5/2009 | Vydiswaran | G06F 16/951 |
| 2009/0198654 A1* | 8/2009 | Surendran | G06Q 10/10 |
| 2009/0281900 A1* | 11/2009 | Rezaei | G06Q 30/02 705/14.55 |
| 2009/0313101 A1* | 12/2009 | McKenna | G06Q 30/0224 705/14.25 |
| 2010/0011053 A1* | 1/2010 | Bhogal | G06Q 10/00 709/203 |
| 2010/0169311 A1* | 7/2010 | Tengli | G06F 16/951 707/736 |
| 2010/0313250 A1* | 12/2010 | Chow | H04L 63/08 726/5 |
| 2011/0055333 A1* | 3/2011 | Guy | G06Q 10/107 709/206 |
| 2011/0066957 A1* | 3/2011 | Prats | G06F 3/04842 715/753 |
| 2011/0078263 A1* | 3/2011 | Watanabe | G06Q 10/107 709/206 |
| 2011/0106892 A1* | 5/2011 | Nelson | G06Q 10/109 709/206 |
| 2011/0131221 A1* | 6/2011 | Bhide | G06F 16/3334 707/755 |
| 2011/0258532 A1* | 10/2011 | Ceze | G06F 16/9574 715/234 |
| 2011/0276360 A1* | 11/2011 | Barth | G06Q 40/08 705/7.23 |
| 2012/0020465 A1* | 1/2012 | Davies | G10L 15/22 379/88.01 |
| 2012/0110085 A1* | 5/2012 | Malik | G06F 16/2228 709/205 |
| 2012/0173644 A1* | 7/2012 | Brown | H04L 51/063 709/206 |
| 2012/0290945 A1* | 11/2012 | Byrne | G06Q 10/10 715/752 |
| 2012/0297025 A1* | 11/2012 | Zeng | G06F 16/951 709/217 |
| 2013/0024924 A1* | 1/2013 | Brady | G06Q 30/0601 726/7 |
| 2013/0097279 A1* | 4/2013 | Polis | H04L 51/12 709/217 |
| 2013/0159433 A1* | 6/2013 | Chavan | G06Q 30/0241 709/206 |
| 2013/0173727 A1* | 7/2013 | Libin | H04L 51/063 709/206 |
| 2013/0179771 A1* | 7/2013 | Dent | G06F 40/103 715/234 |
| 2013/0253976 A1* | 9/2013 | Shukla | G06Q 10/107 705/7.26 |
| 2013/0254855 A1* | 9/2013 | Walters | G06F 21/50 726/5 |
| 2013/0311587 A1* | 11/2013 | Malik | H04L 51/32 709/206 |
| 2013/0325971 A1* | 12/2013 | Winer | G06Q 10/1091 709/206 |
| 2013/0339849 A1* | 12/2013 | Mebed | G06Q 10/107 715/273 |
| 2014/0196066 A1* | 7/2014 | Wu | G06F 16/78 725/14 |
| 2014/0237382 A1* | 8/2014 | Grandhi | G06F 3/04883 715/752 |
| 2014/0244242 A1* | 8/2014 | Galvin, Jr. | G06F 40/30 704/9 |
| 2015/0033141 A1* | 1/2015 | Mishra | H04L 51/22 715/752 |
| 2015/0033283 A1* | 1/2015 | Mulder | H04L 63/0245 726/1 |
| 2015/0066895 A1* | 3/2015 | Komissarchik | G06F 16/345 707/709 |
| 2015/0067037 A1* | 3/2015 | Ishihara | H04L 67/02 709/203 |
| 2015/0135104 A1* | 5/2015 | Osterhoff | G06F 8/20 715/765 |
| 2015/0150091 A1* | 5/2015 | Bruce | H04L 63/101 726/4 |
| 2015/0236995 A1* | 8/2015 | Hammer | H04L 51/28 709/206 |
| 2015/0242483 A1* | 8/2015 | Zhou | G06F 16/86 707/736 |
| 2015/0278883 A1* | 10/2015 | Stergiou | G06F 40/154 705/14.73 |
| 2015/0288638 A1* | 10/2015 | Pyla | H04L 51/18 709/206 |
| 2015/0365391 A1* | 12/2015 | Chow | G06F 16/22 726/4 |
| 2016/0063608 A1* | 3/2016 | Hawilo | H04W 4/21 705/26.81 |
| 2016/0249249 A1* | 8/2016 | Won | H04W 28/0289 |
| 2017/0039296 A1* | 2/2017 | Bastide | H04L 51/34 |
| 2017/0048273 A1* | 2/2017 | Bach | H04L 63/101 |
| 2017/0069043 A1* | 3/2017 | Doyle | G06F 16/24575 |
| 2017/0149893 A1* | 5/2017 | Wu | H04L 41/12 |
| 2017/0161372 A1* | 6/2017 | Fern Ndez | G06F 40/268 |
| 2017/0289293 A1* | 10/2017 | Rubtsov | H04L 67/2823 |
| 2017/0302671 A1* | 10/2017 | Rivelli | G06Q 50/18 |
| 2017/0366490 A1* | 12/2017 | Rose | H04L 51/063 |
| 2018/0020243 A1* | 1/2018 | Ni | G11B 27/031 |
| 2018/0048595 A1* | 2/2018 | Dotan-Cohen | H04L 51/08 |
| 2018/0124479 A1* | 5/2018 | Taylor | H04L 43/16 |
| 2018/0145940 A1* | 5/2018 | Stuntebeck | G06Q 10/107 |
| 2018/0302441 A1* | 10/2018 | Mulder | G06F 21/6236 |
| 2019/0171693 A1* | 6/2019 | Dotan-Cohen | G06T 11/206 |
| 2019/0356769 A1* | 11/2019 | Togwe | H04L 51/20 |

* cited by examiner

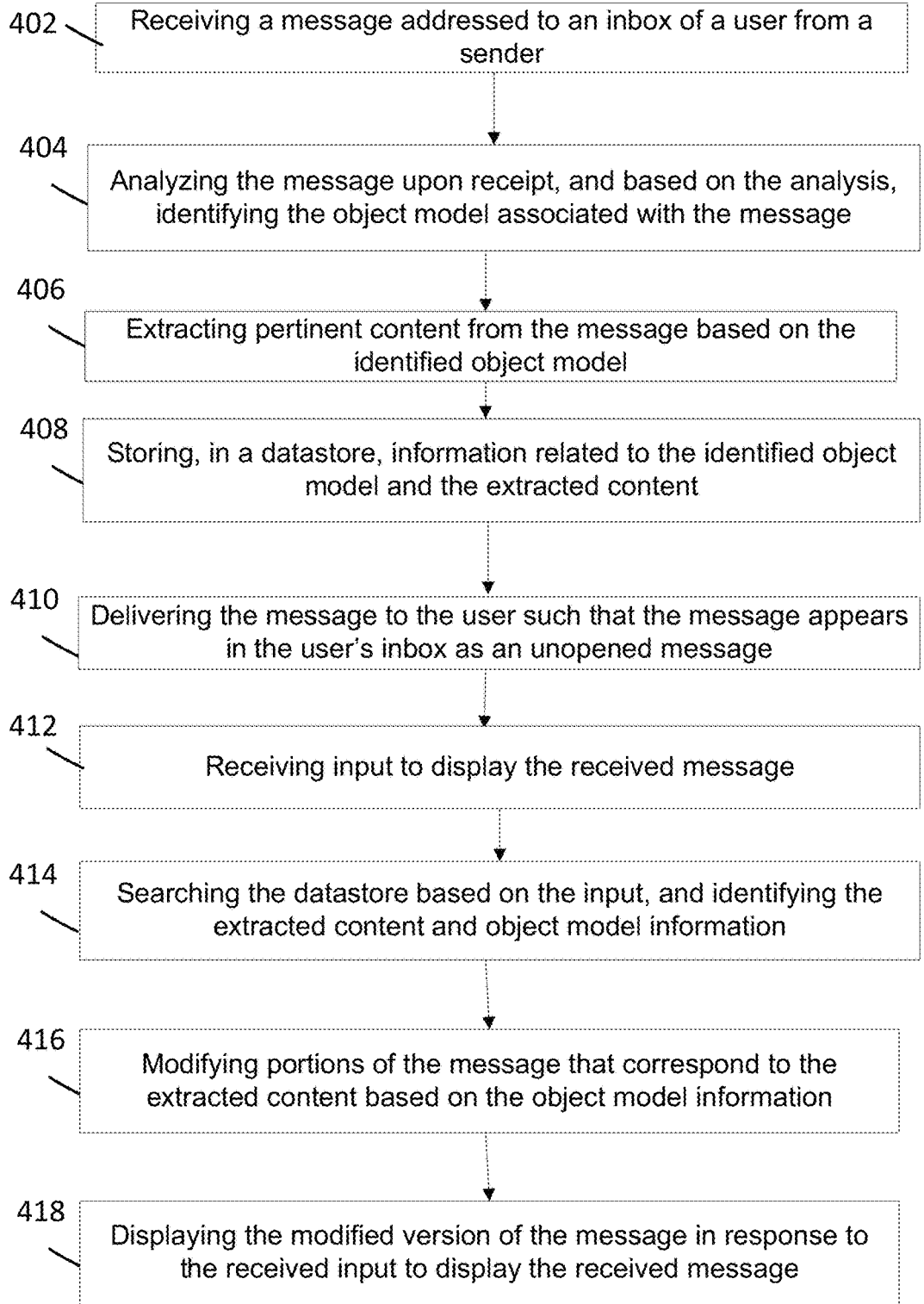

FIG. 5A

Prior Art

COMPUTERIZED SYSTEM AND METHOD FOR DISPLAY OF MODIFIED MACHINE-GENERATED MESSAGES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved framework for analyzing messages received at and stored within an inbox of a user, and providing functionality alerting the user to specific forms of content included within each message via an improved graphical user interface that facilitates more efficient navigation of message content by users.

BACKGROUND

Electronic mail (email) traffic keeps increasing, where the increase is mainly caused by high volumes of machine generated traffic. The growth and usage of machine generated electronic mail has seemingly become ubiquitous over the last few years. Auto-generated content such as, for example, purchase receipts, order confirmations, travel reservations, events and social notifications, to name just a few examples, are routinely created by commercial companies and organizations, and account for over 90% of the non-spam Web mail traffic. In fact, on a daily basis, such forms of electronic messages (i.e., emails) can amount to billions of messages.

The task of precisely identifying key elements within this form of digital content in a truly scalable manner is of great importance to both users and service providers, and can be leveraged for applications such as ad re-targeting, mail search, and mail summarization.

SUMMARY

The disclosed systems and methods provide a technical solution to existing technical problems, especially those highlighted above, by providing a novel framework for a universal message extraction and propagation system. According to some embodiments, the disclosed framework analyzes messages prior to their delivery to an inbox of a user, and provides functionality to the inbox for alerting the user to specific forms of content included within each message when they are displayed. The present disclosure describes computer systems, interfaces and methods that determine and display specific message content in a modified manner when its associated message is displayed from a message inbox.

According to some embodiments of the instant disclosure, when a message addressed to a user of a messaging platform is received at a server(s) hosting such platform, the message content associated with the message is analyzed, extracted or otherwise identified, from which an interface is provided for displaying the identified content. As will be clear from the discussion below, the type of message, domain and/or message platform from which the message originated and/or was delivered does not impact the processing being performed by the disclosed framework, as the disclosed systems and methods provide a universal message identification and display technique that can function on any type or form of message due to the analysis of the message's structure and modified display based therefrom.

As a result of such messaging processing, in some embodiments, when the message is provided to the intended user for display (and not when it is delivered, as in conventional systems), an improved user interface is produced that displays a modified version of that message, where the vital information included therein is highlighted or displayed in a modified manner. The automatic pre-processing (or pre-extraction prior to delivery, as discussed below) being performed by the server as messages are received from senders eliminates the need for users to perform manual search queries for specific messages or specific forms/types of content included therein. Thus, as the server receives, processes and then passes on the messages to user accounts/devices, the messages are in-effect pre-processed so that the content included therein is ready for indexing, discovery and display within the receiving user's inbox.

This has a clear technical benefit for mailing systems, how they operate and how the disparate device resources of such systems are allocated and utilized. The pre-processing performed by the server eliminates the need for a device/user to search for and/or perform actions for identifying specific content items, types or forms within incoming or stored messages. The messages are pre-analyzed by the server prior to their delivery and are provided to the user in the novel manner discussed below and illustrated for example in FIGS. 5A-5B. Ultimately, this reduces the processing drain on the receiving client device and frees up resources for the client device. For example, throughput overhead on the client device in accessing an inbox or executing a mail application is reduced as the client device only now has to execute the instructions resultant from the server's pre-processing of the message(s).

The server's pre-processing reduces resource overhead on the network—that is, rather than having the client device receive a message and then send/receive requests/instructions with the server for handling the messages, the server pre-performs these instructions prior to the message's delivery thereby enabling the client device to modify the message upon its display. The client device simply must execute the server's instructions upon receiving input to open and display a modified version of the received message. Essentially, numerous functions for processing and handling messages are moved from the client device (as in conventional systems) to the server, which makes for a more efficient system of handling messages, and reduces the networking and computing resources required for handling the messages and processing message/content delivery.

Thus, as discussed in more detail below, for example, when a message is received in a user's inbox and is subject to user input requesting the display of the message, a modified version of the message is generated and then displayed within the inbox viewing portion of the UI of the inbox. According to some embodiments, as discussed in relation to FIGS. 5A-5B, the display can be modified to indicate that the message includes content of a specific type.

Therefore, according to some embodiments, as discussed in more detail below, the disclosed framework provides technical solutions to technical problems that conventional systems do not address. That is, the disclosed framework embodies an efficient, fully-automated process that can be deployed at a very large scale.

Additionally, the framework is not dependent on a particular category of email message (e.g., purchase receipts, hotel reservations, and flight ticket confirmations)—rather, the framework operates independent from specific platforms, message-types and/or domains, and can be applied universally to all forms of messages as they are displayed.

The disclosed framework is also complementary to any extraction method (either semi- or fully-automated)—therefore, since its application is based on when messages are displayed, any technical advancements in the way messages are analyzed and have their content extracted does not impact how the messages are displayed, as the disclosed framework's functionality remains applicable.

And, the framework manipulates the message body itself, and avoids the need for additional screen space when alerting users to types of content within messages, which is especially critical on mobile devices' smaller displays. Therefore, when conventional systems are modifying message displays by adding to the screen real-estate such messages are occupying on a device's display (as illustrated in FIG. 5A), the disclosed framework's message modification technique is providing a more efficient use of a UI or screen real-estate by providing reduced "footprint" on the device's display (as illustrated in FIG. 5B), thereby providing more real-estate for other processes to display their results.

As discussed herein, reference to "messages" can be any type of message that is receivable within any known or to be known messaging or email system. The message content comprised within such messages can be any type of message content, such as, but not limited to, text, audio, video, graphics interchange format (GIF) files, digital advertisements, and/or any other type of known or to be known multimedia, or some combination thereof. The modified UI provided by the disclosed framework can be applied and displayed to/by any type of message or communication system, application, platform, web-based system or service hosting and/or associated with a user's mailbox to improve that system's functionality.

According to some embodiments, as discussed in more detail below, in embodiments where the message content is associated with and/or contains or itself constitutes a digital advertisement media item (e.g., an HTML message), the ability for a user to navigate from his/her personal messages to the digital ad content displayed within the portion of the inbox enables the increase of valuable impressions of online media that can increase monetization through higher click-through-rates (CTRs) and increased return-on-investment (ROI), revenues, salience and relevance of served content/online media.

In accordance with one or more embodiments, the instant disclosure provides computerized methods for a novel framework for analyzing messages addressed to an inbox of a user, and providing functionality alerting the user to specific forms of content included within each message when they are displayed. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for analyzing messages addressed to an inbox of a user, and providing functionality alerting the user to specific forms of content included within each message when they are displayed.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 4 is a schematic diagram illustrating components of an exemplary system in accordance with embodiments of the present disclosure;

FIGS. 5A-5B illustrate non-limiting example embodiments of the mechanisms for alerting users to specific types of content within messages of a user's inbox according to some embodiments of the present disclosure.

DESCRIPTION OF EMBODIMENTS

Figure 1:
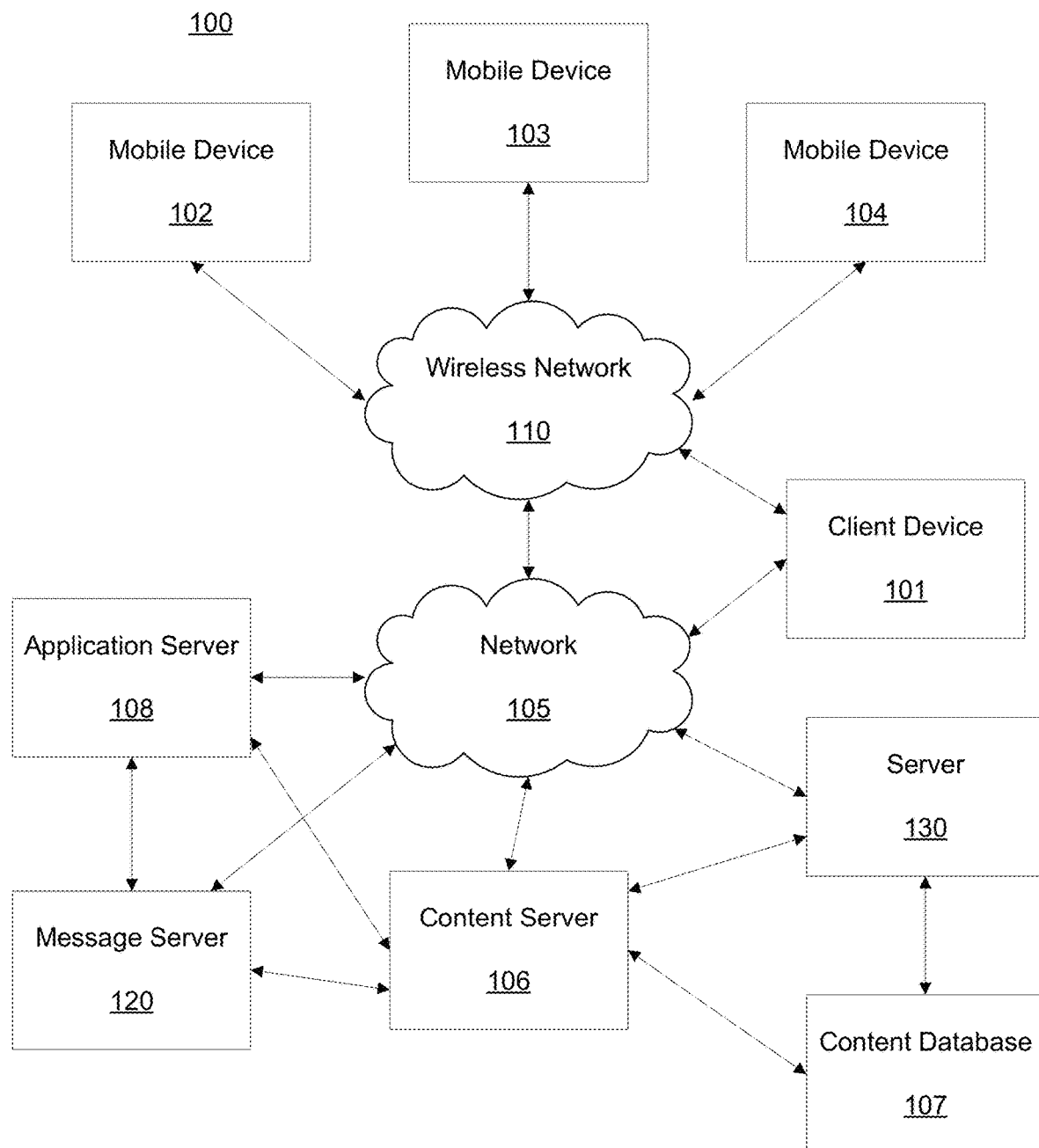
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The instant disclosure provides improved systems and methods for processing, delivering and displaying message content in a modified manner within an inbox of a messaging system.

Machine-generated messages are commonly created by scripts on behalf of commercial entities or organizations, and comprise more than 90% of non-spam Web mail traffic. Examples of such forms of messages include, but are not limited to, purchase receipts, travel reservations, events and social notifications, and the like. The two main characteristics of such messages are their inherent structure, and the scale of their target user population.

Recently developed semi- and fully-automated extraction techniques leverage these repetitive patterns within such messages to identify and extract valuable segments from these messages. Examples of desired elements for extraction include the purchased items in an order confirmation email and their respective delivery dates, or the travel details in a travel itinerary email.

Users can clearly benefit from the disclosed technology, as often most of the contents of these email messages is general and repetitive, while only a few bits and pieces contain useful information. For example, a flight itinerary, where most of the email body comprises general terms and conditions, includes key details such as the booking reference number, the departure time, gate number, and the like.

However, prior to the advent of the disclosed technology, leveraging this data for an enhanced user experience still required some manual effort. By and large, displaying the pertinent information of an email in a dedicated section of the screen requires a specified design. Thus, using conventional systems, the design of each message type had to be tailored to each message type (e.g., purchase receipts, travel reservations). This is a cumbersome, resource-draining, repetitive task that has endless forms, as there are endless types of messages users receive, which leads to inaccuracies in which types and forms of content are identified.

Therefore, the disclosed systems and methods provide a message framework that surfaces the pertinent data parts in each message in a fully-automated manner, which can also work effectively across any type or form of message, whether known or to be known. The disclosed framework can highlight these segments within the message body itself. Thus, identifying and highlighting the informative parts of messages enables users to quickly and conveniently locate and retrieve the information that they need/desire. Such modifying (e.g., the highlighting) relies on extracted data from the message, which as discussed below, is performed by a semi-automated or a fully-automated technique when the message is transmitted to and received by the server (and/or in accordance with its delivery to the inbox, yet prior to its "opened" display within the recipient's inbox), as discussed in more detail below in relation to FIG. 4.

Figure 5A:
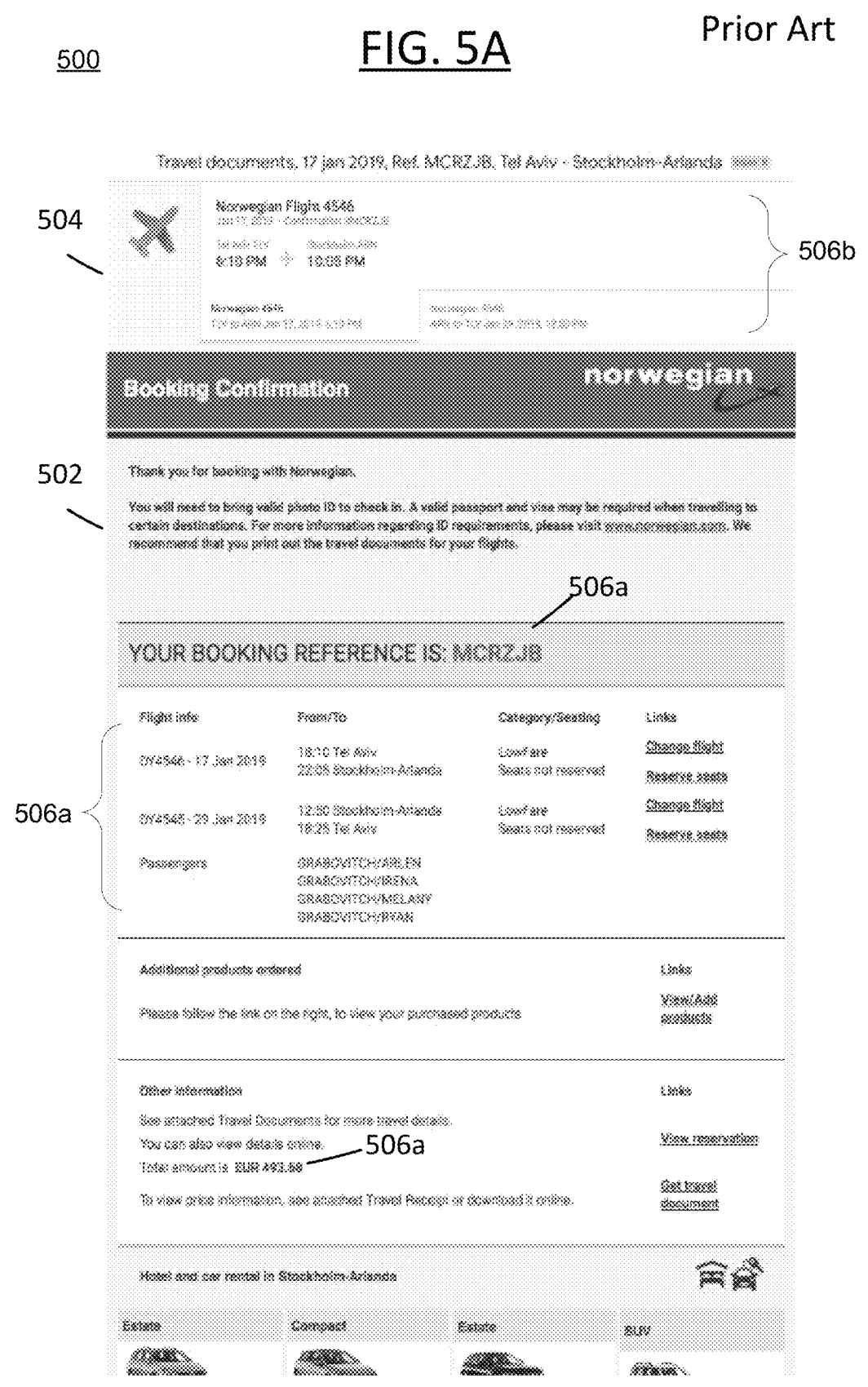
Figure 5B:
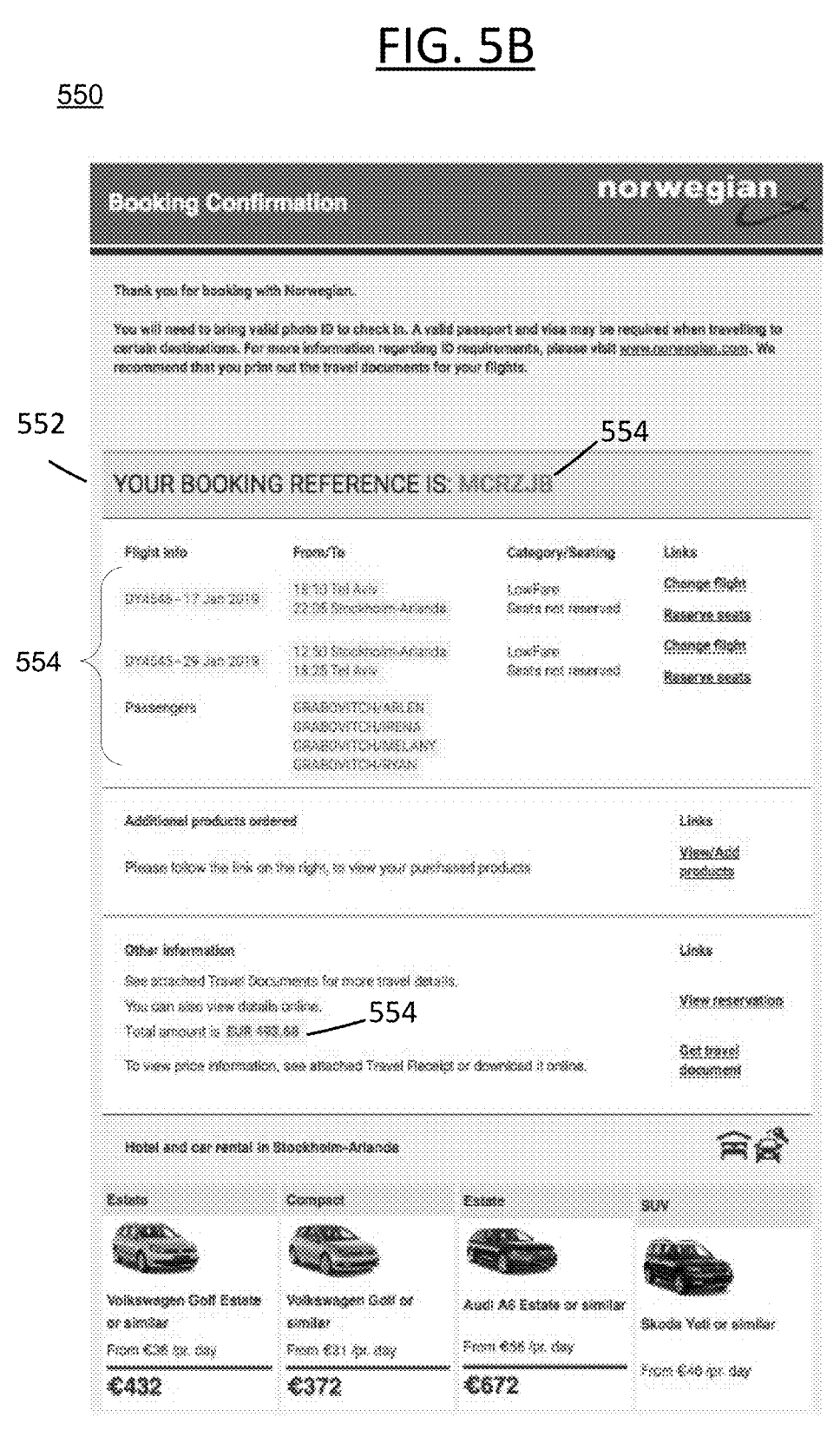

By way of non-limiting, contrasting examples, FIG. 5A depicts a conventional system where pertinent content of a message is copied and displayed in an appended/added section of a displayed message, and FIG. 5B depicts the modified message display as a result of the disclosed framework opening and displaying a modified version of a received message.

FIG. 5A includes a message 500 that has been received by a user's inbox and is displayed. In this example, the message 500 is a travel message that includes a travel itinerary for the user. As discussed above, in conventional systems, the body 502 of the travel message 500 is analyzed, and after identifying the pertinent information 506a (e.g., the travel itinerary) from within the body 502, the message is modified to display additional section/portion 504. Portion 504 adds to the screen real-estate taken up by the message 500, and displays the pertinent information 506b (which is a re-display of information 506a pulled from the body 502).

In contrast, and in a more resource efficient manner, especially with regard to how the information is displayed, FIG. 5B illustrates how the same message 500 (message 550 for purposes of FIG. 5B) has its same pertinent content within the body of the message highlighted or modified to emphasize where the vital information can be found. As discussed in more detail below, this technique addresses the user's information needs without requiring any additional screen space (e.g., a more efficient use of a UI), and can be extended to various message types, as it is fully-automated and applied universally to all forms of messages and content.

In FIG. 5B, message 550's pertinent content 554 is highlighted when the message is displayed. This causes the original message that was delivered to the inbox of the recipient user to be modified upon an instruction to open and display the message (as discussed in more detail below in relation to FIG. 4). Therefore, within the body 552 of the message 550, the pertinent content 554 is identified and displayed in a modified manner.

In some embodiments, such modification can involve displaying the content such that it appears "highlighted" so that a user can easily scan the message and locate where such information is located therein. In some embodiments, as discussed below, such modification can involve other forms of modification, including, but not limited to, changing the font color, font size, font, font effect, and the like, altering the structure of the content to make it hypertext, or even "blacking out" non-pertinent text so that only the pertinent text remains, and the like.

In the example of FIG. 5B, the pertinent content 554 includes the travel itinerary, booking reference number, total amount paid, and the like. This information was deemed pertinent to the travel-type message upon the extraction performed on the message upon its handling by the server prior to its delivery to the inbox of the user, and prior to its display by the client (or handling) device, as discussed in more detail below in relation to FIG. 4.

Therefore, the disclosed systems and methods provide a universally applied framework for analyzing all forms and types of messages being communicated over network, and providing functionality to an inbox for alerting a user to specific forms or types of content included within received and displayed messages. Such functionality can include displaying messages and/or the content contained therein in a modified manner thereby enabling an increased ease and efficiency in which such content is consumed. The messages can be modified upon display within the inbox to indicate and identify that the message includes content of a specific type.

As discussed in more detail below at least in relation to FIG. 6, according to some embodiments, information associated with, derived from, or otherwise identified from, during or as a result of the modified message display, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
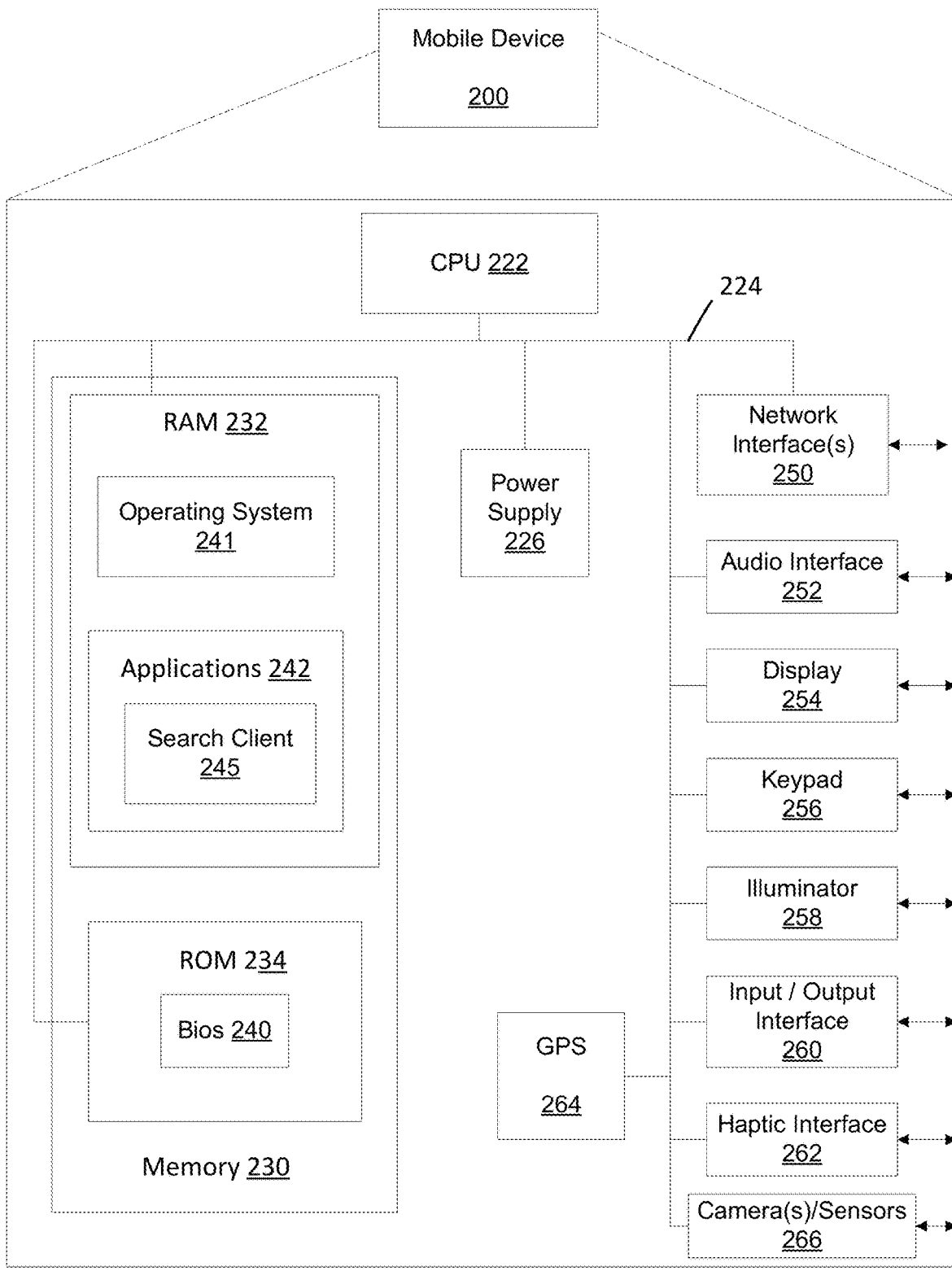
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, tri-angulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-6.

Figure 3:
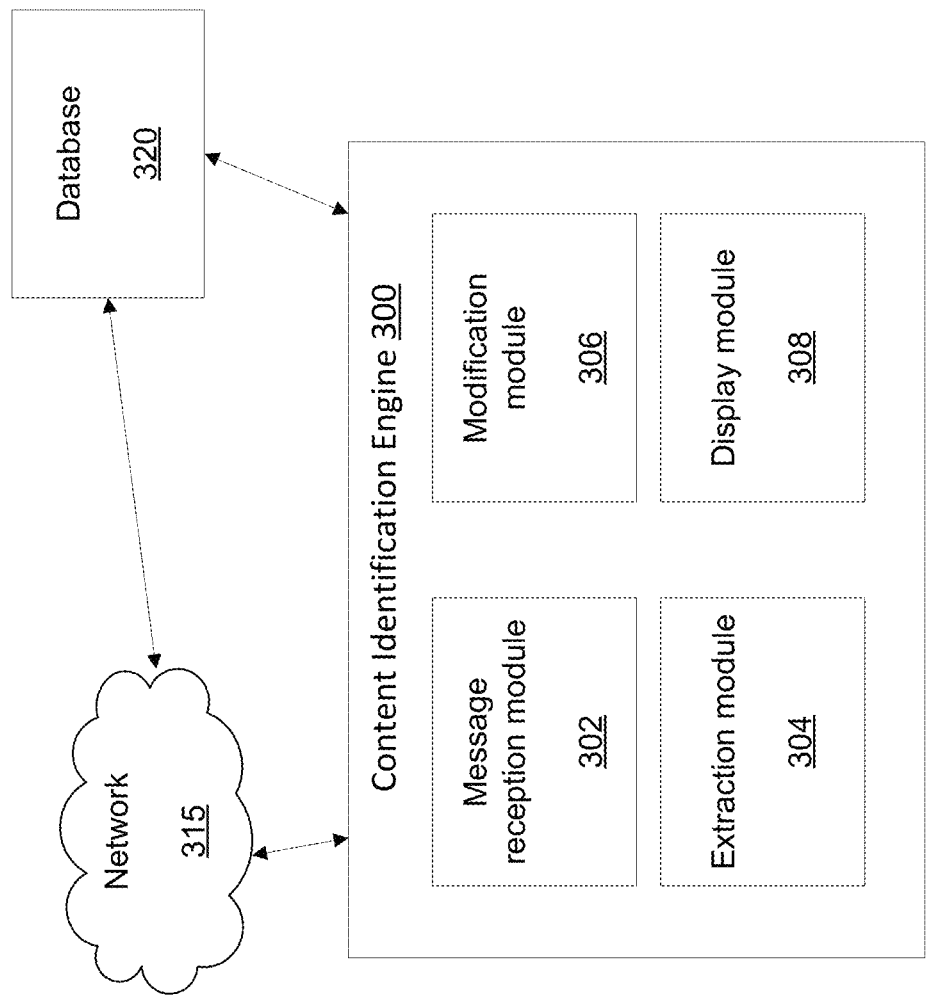
FIG. 3 is a block diagram illustrating components of an exemplary system in accordance with embodiments of the present disclosure.

FIG. 3 is a block diagram illustrating the components for performing the systems and methods discussed herein. FIG. 3 includes content identification engine 300, network 315 and database 320. The content identification engine 300 can be a special purpose machine or processor and could be hosted by an application server, content server, social networking server, web server, email server, search server, content provider, third party server, user's computing device, and the like, or any combination thereof.

According to some embodiments, content identification engine 300 can be embodied as a stand-alone application that executes on a user device. In some embodiments, the content identification engine 300 can function as an application installed on the user's device, and in some embodiments, such application can be a web-based application accessed by the user device over a network. In some embodiments, the content identification engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and other mediums that display digital content information in whole or in part (e.g., a map), and the content included therein, including, text, audio, images, multimedia, RSS feed information, can be used without departing from the scope of the instant application, which can thereby be communicated and/or accessed and processed by the content identification engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the content identification engine 300, and the database of stored resources 320. Indeed, as illustrated in FIG. 3, the content identification engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as content identification engine 300, and includes message reception module 302, extraction module 304, modification module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to FIG. 4, Process 400 provides an example data flow that details embodiments of the disclosed framework for analyzing messages shared over a network (e.g., messages that have been sent, received, and/or are being sent and/or received), and identifying content included therein that is of particular interest to the user. As a result, Process 400 enables the inbox UI's functionality to be modified so as to alert the user to the arrival of such specific content in his/her inbox (as illustrated in FIGS. 5A-5B, and discussed in more detail herein).

According to some embodiments of Process 400 of FIG. 4, Steps 402 and 410 of Process 400 are performed by the message reception module 302 of the content identification engine 300; Steps 404-408 are performed by the extraction module 304; Step 412-416 are performed by the modification module 306; and Step 418 is performed by the display module 308.

Process 400 beings with Step 402 where an incoming message sent by a sender and addressed to an inbox of a recipient user is received by a server (e.g., messaging server 120). In some embodiments, Step 402 and the subsequent steps of Process 400 can be performed for each incoming message addressed to a recipient's inbox.

In some embodiments, as understood by those of skill in the art, the steps of Process 400 can be performed by messages already delivered to the inbox of the message, whereby the server is mining the inbox for past messages in order to identify their pertinent information, as discussed herein. While the focus of the discussion herein will focus on incoming messages, one of skill in the art would understand that such mining for messages can be embodied through execution of the steps of Process 400 without departing from the scope of the instant disclosure.

In Step 404, the received message is analyzed by engine 300 executing on the server, and based on the analysis, the object model of the message is identified. As understood by those of skill in the art, the object model can include information indicating the structure of the message's body, and take the form of any known or to be known type of object model, including, but not limited to, Hypertext Markup Language (HTML) tags or an HTML path, or XPath of the message, document object model (DOM), markup language elements, a message schema, and the like In some embodiments, the incoming message and/or a set of messages (e.g. a message thread) analyzed by Process 400 can be a message(s)s addressed to the user's inbox. The identification of the messages can be based on criteria such that only a set of all the messages in the inbox are identified.

According to some embodiments, such criteria can reference a type of message (e.g., personal or commercial messages), the type of content included in the message (e.g., text, audio, video, multi-media, and the like), a context of the message (e.g., is the message related to a promotion, purchase receipt, expiring deal, future activity, and the like), a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), how was the message checked/read (e.g., did the user open and read the message from an application on his/her mobile device), how often or recent (compared to a threshold) did the user contact or receive correspondence from the sender/recipient, and the like, or some combination thereof.

Therefore, according to some embodiments, Step 404 can involve analyzing received or incoming messages according to the criteria and identifying a message set (e.g., a single message or a plurality of messages) that satisfy the criteria. This enables engine 300 to efficiently analyze and process a smaller set of messages, as those messages not satisfying the criteria are filtered out and automatically passed to the inbox without further processing, which alleviates the system from having to perform unnecessary analysis of certain types of messages (e.g., spam messages received during a same time a message from a commercial sender providing a deal is occurring).

For example, Step 404 can involve determining that an incoming message is sent by a third party commercial sender. For example, a user receives 100 emails a day—therefore, according to Step 406, engine 300 can identify a subset of those emails that are from commercial entities, thereby filtering out those messages that do not have a specific form of pertinent information—e.g., a coupon, deal or promotional information included therein.

According to some embodiments, Step 404 can involve parsing the data of each message addressed to the user's inbox that is received at the server, and after analyzing the message based on the above criteria, identifying each message in the set therein (e.g., based on the criteria).

According to some embodiments, Step 404 can involve engine 300 identifying the type of information referenced in the message based on language content in the message. In some embodiments, this can be focused on the plain text of the message, and in some embodiments, this can alternatively or additionally involve the text within multi-media portions of the message. In some embodiments, engine 300 may analyze the language content by executing software defined by a natural language processing (NLP) algorithm. An NLP algorithm, in one embodiment, can use probabilistic methods to identify one or more topics from the language content of the message. In some embodiments, engine 300 may search for keywords within the language content, the keywords being associated with particular topics.

In some embodiments, engine 300 can identify the type of information referenced by the message based on a syntactic analysis or a sematic analysis of the language content of the message. The syntactic analysis may involve parsing the message into discrete components, such as clause or phrases, where each component has a central idea (e.g., a keyword). The semantic analysis may involve identifying the central idea of each discrete component identified through the syntactic analysis.

In some embodiments, the analysis of the messages by the engine 300 can involve the engine 300 implementing a parser on the backend in order to analyze the information (e.g., sender information, text, images, audio, video and/or multimedia) of the message. The parser can be responsible for extracting any relevant content from the message using natural language processing techniques, from which the context and item information, as discussed below, can be determined, derived or otherwise identified.

In some embodiments, for example, the message analysis performed in Step 404 can determine a type of the message, and use this message type determination to extract specific portions of information from the message. For example, using FIG. 5B as an example, the message is determined to be a "travel", or more specifically "flight" message. This has an associated schema associated with it, for example:

| Property | Expected type | Description |
|---|---|---|
| aircraft | Text | Kind of aircraft (e.g., Boeing 747) |
| arrivalAirport | Text | Where flight terminates |
| arrivalGate | Text | Flight's arrival gate |
| arrivalTerminal | Text | Flight's arrival terminal |
| departureAirport | Text | Where flight originates |
| flightNumber | number | Unique number indicating IATA code |
| estimatedDuration | Time | Time the flight will take |

Therefore, when analyzing the flight message using its object model, as discussed below in Step 406, the pertinent information of the message can be identified based on the type or schema of the message.

In Step 406, the incoming message, after its analysis in Step 404, is then further analyzed, parsed and has specific content (referred to as "pertinent content) from within the message extracted based on the object model identified from the message (also referred to as "clipping" the content from the messages, as discussed below). For example, if a user received a message from "Home Depot" indicating a weekend deal on Stihl® products, where the message included a digital coupon included therein, then the digital coupon information from the message is identified (based on the object model), is extracted (as in Step 406), and is stored (as in Step 408, discussed below).

In another non-limiting example, using message 550 from the example in FIG. 5B as a basis, the user receives message 550 that includes travel itinerary information 554 within the body 552 of the message 550. The analysis of Step 404 results in the identification of pertinent information 554 (e.g., that information 554 exists within the message, and where, within the body of the message, it is located, which is then extracted and stored.

According to some embodiments, there are number of ways to extract data from messages (e.g., HTML documents/messages). In some embodiments, such extraction occurs using any known or to be known data extraction technique, algorithm or mechanism that can be performed online, offline, or some combination thereof, in a semi-automatic manner or fully-automatic manner, or some combination thereof, including, but not limited to, Bayes classifiers, entropy models, logics regression models, neural networks, Hidden Markov models, conditional markov models, maximum-entropy markov models, conditional random fields (CRF), and the like, or other forms of entity recognition and/or NLP processing methodology.

In Step 408, the extracted content from the message is stored in a datastore (e.g., database 320) in association with the received message's object model. Such storage may involve annotating the extracted content such that its association within the message, and within specific portions of the object model can be later determined and utilized for re-inserting the content back into the message. In some embodiments, such storage of the object model and the extracted content can be stored in a look-up table (LUT) that enables the identification of such associated information based on an identifier of the corresponding message. In some embodiments, such storage can occur alternatively or additionally in the cache of the client device, to enable offline modification of a message when it is opened.

In some embodiments, the extraction of the content can involve removing the content from the body of the message and storing it in the datastore, where it can then be inserted (in a modified form) back into the message upon the message being opened and displayed (as discussed in detail below in relation to Steps 414-418). In some embodiments, the content stored in the datastore is a copy of the identified content, which is used as a basis for the modification, as discussed below.

In Step 410, the server then delivers the message to the inbox of the recipient user. This causes an "unopened" and unmodified version of the message to be displayed within a message listing section of the inbox.

In Step 412, input is received respective to the unread version of the delivered message. The input indicates that the message is to be opened and displayed within the UI of the inbox. The input, as one of skill in the art would understand, can be based upon any known or to be known type of input, whether received from the user, or as part of a conditional message delivery. For example, the input can be a selection by the user (e.g., a double-click on a message or a touch-input) indicating that the message is to be opened and displayed. In another example, the message may be assigned a delivery condition to open when the user is at a specific location, such that when the user is determined to be at that location, the message is caused to be opened based on the delivery condition being satisfied.

In response to receiving the input from Step 412, Step 414 involves querying and searching the datastore in order to identify the stored object model and extracted content associated with the message. The search can be based on an identifier (ID) of the message selected from the input of Step 412. Therefore, upon receiving a selection of the message in Step 412, the ID of the message is identified, which can be utilized as a query of the datastore in order to identify that message's specific object model and extracted content.

In Step 416, upon locating (e.g., and retrieving) the extracted content and object model information from the datastore, engine 300 then maps the extracted content to the selected message based on the object model information. This enables the extracted content's location within the selected message to be determined, which is indicated by the object model information, as discussed above. Therefore, the specific portion of the message associated with the content can be modified, as discussed below.

Step 416 further involves leveraging such mapping in order to modify portions of the selected message that correspond to the extracted content upon the message being opened and displayed. According to embodiments, the received, analyzed and (un-opened) delivered message maintains it original version until it is opened and displayed. Therefore, only upon the message being selected for opening and display within the inbox UI is the message modified so that the pertinent portions (e.g., the extracted content) of the message are displayed in an altered form, as discussed herein (and illustrated in FIG. 5B, as discussed above). The altered form visually differentiating the pertinent portions from the other portions of the message, and visually comprising display characteristics that are different from the original display characteristics of the pertinent portions.

In some embodiments, a new version of the message can be generated, which is a modified version of the original message. The new version depicts the extracted content as a modified version of its original self. This involves identifying, based on the object model, the locations of the extracted content, modifying the extracted content to highlight it, then inserting the modified versions of content into the new message version (where the remaining unmodified content maintains its original display characteristics).

For example, using FIG. 5B as an example, the portions of the travel message associated with the extracted content, items 554, can be highlighted—e.g., a darker color applied, a bolding weight applied, a defined font applied, and the like—which alters how that content (e.g., text) is displayed within the message when the message is displayed. For example, in FIG. 5B, message 550's content 554 is highlighted in yellow to indicate its importance to the message. The remaining content maintains it unmodified look when displayed.

According to embodiments of the message, the portions of the structure and/or object code of the message that are modified (either in the altered version of new message version) are subject to modification which enables the modified display characteristics to take effect. For example, when text is changed to be highlighted when it is displayed, the object code of the message corresponding to that modified text is altered to indicate that specific type of change, so that when the message is opened it is displayed, and if the message is closed, then re-opened, the modification remains. Such modification can be an annotation to the text's code in the object model, or can be a rewriting of the code entirely. In some embodiments, such object code modification can be propagated to the datastore (or cache) for storage and easy retrieval for later implementation.

Thus, in Step 418, the modified version of the message is generated and displayed in response to receiving the input to display the received message. Display of an example modified message is depicted in FIG. 5B.

Figure 6:
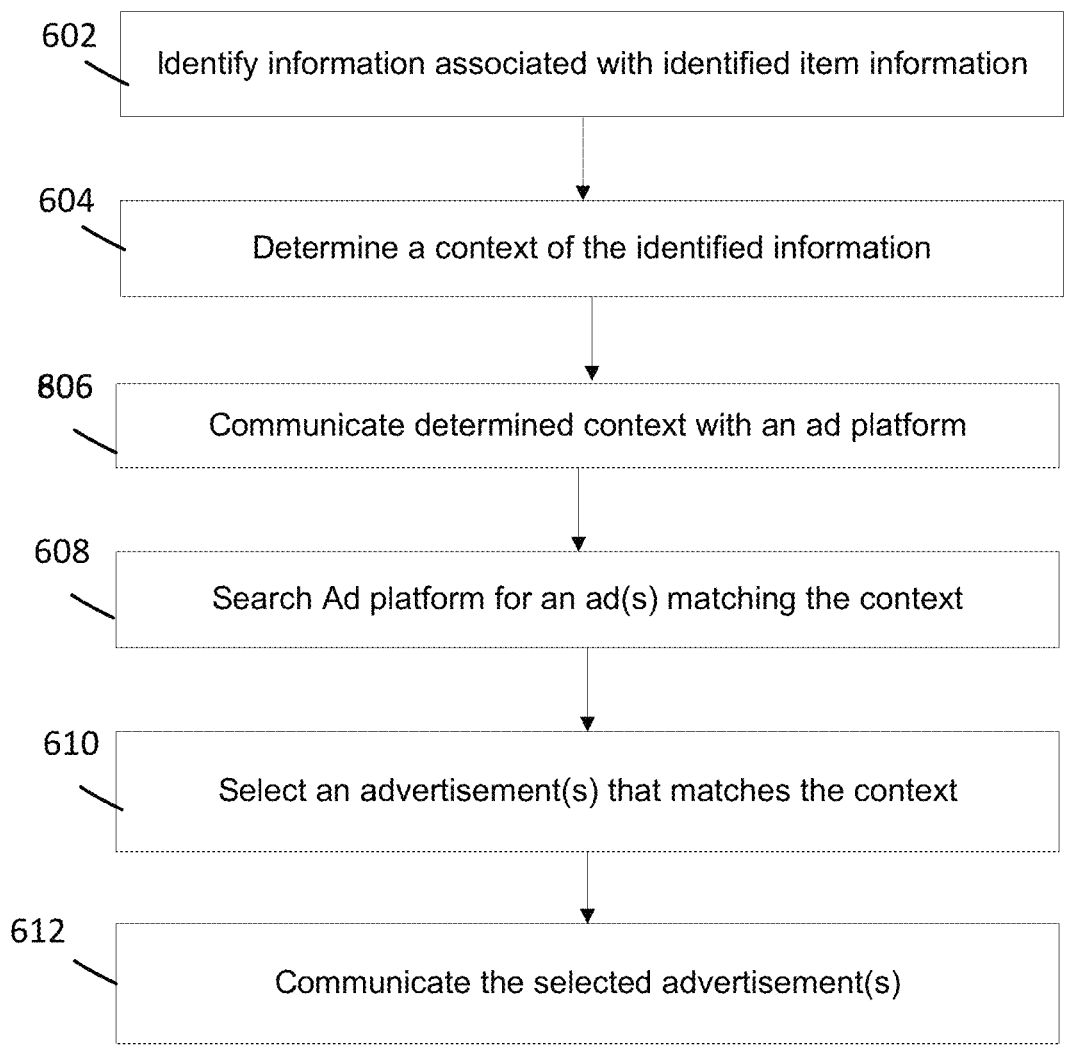
FIG. 6 is a block diagram illustrating an exemplary data flow in accordance with some embodiments of the present disclosure.

FIG. 6 is a work flow process 600 for serving related digital media content based on the information associated with an identified item from displayed message within a user's inbox, as discussed above in relation to FIGS. 4-5B. In some embodiments, the content can be associated with or comprising advertisements (e.g., digital advertisement content). Such content, referred to as "item information" for reference purposes only, can include or be based upon, but is not limited to, information associated with an object a user received in his/her mailbox (e.g., a message or modified content, for example), a context of a user's activity on a network and the like (e.g., how did the user interact with a message or extracted item information, and/or some combination thereof).

Process 600 discusses embodiments for engine 300 to provide functionality for mail systems to partner with third party entities enabling the entities to source digital content for display within an inbox of a user based on the item information determined, discovered, derived or otherwise identified from Process 400, as discussed above.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 602, item information is identified. As discussed above, the item information can be based any of the information utilized, determined and/or generated from/during the mail pre-processing and delivery mechanisms outlined above with respect to FIGS. 4-5B. For purposes of this disclosure, Process 600 will refer to single identified item from an opened message for serving additional content; however, it should not be construed as limiting, as any number of items, messages and/or views, as well as programs used can form such basis, without departing from the scope of the instant disclosure.

In Step 604, a context is determined based on the identified item information. This context forms a basis for serving content related to the item information. In some embodiments, the context can be in accordance with whether a user interacted with the item information included in a clipped content item.

For example, a user receives a message from Ticketmaster® for NHL® tickets for a game between the Boston Bruins® and Dallas Stars®. The date, time and seat numbers within TD Garden® are highlighted when the message is opened, as discussed above. Therefore, the context identified in Step 604 can be related to "hockey". This context can be leveraged in order to identify digital content related additional deals for the user at TD Garden on the date of the game—for example, coupons for stores located on the mezzanine/level the user is sitting at when at the game.

In some embodiments, the identification of the context from Step 604 can occur before, during and/or after the analysis detailed above with respect to Process 400, or it can be a separate process altogether, or some combination thereof.

In Step 606, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 608, the server searches the database for a digital content item(s) that matches the identified context. In Step 610, a content item is selected (or retrieved) based on the results of Step 608. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a message, text, media, content or object item. Step 612. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    receiving, at a messaging server, an electronic message addressed to an inbox of a user sent by a sender, the electronic message comprising digital content within a body of the message;
    identifying, via the messaging server, an object model associated with said electronic message;
    analyzing, via the messaging server, said electronic message based on said object model, and based on said analysis, determining a portion of said digital content, said portion comprising pertinent information corresponding to a context of said electronic message;
    extracting, via the messaging server, said digital content portion, said extraction comprising modifying the electronic message by removing the digital content portion and storing the removed portion in storage, the modified electronic message being a first modified electronic message;
    delivering, via the messaging server, said first modified electronic message to said inbox, said delivery causing the first modified electronic message to be displayed within a portion of a user interface (UI) of said inbox as an unopened message;
    receiving, via the messaging server, a request to open the first modified electronic message;
    retrieving, via the messaging server, in response to the request and prior to opening the first modified electronic message, the removed portion from the storage;
    modifying, via the messaging server, the retrieved portion by altering visual characteristics of the retrieved portion that correspond to the context;
    inserting, via the messaging server, the modified portion into the first modified electronic message based on the object model, said insertion causing a creation of a second modified electronic message; and
    causing, via the message server, in response to the request to open the first modified electronic message, the second modified electronic message to be opened and displayed within the inbox UI.

2. The method of claim 1, further comprising:
receiving input associated with the displayed unopened message to open the displayed unopened message, wherein said caused display of the second modified electronic message is based on said received input.

3. The method of claim 1, further comprising:
storing, in a datastore associated with said messaging server, said extracted digital content portion and information associated with said object model, said extracted digital content portion and information associated with said object model being stored in association with each other and an identifier of the received electronic message.

4. The method of claim 3, further comprising:
searching said datastore for said extracted digital content portion and information associated with said object model based on said identifier; and
identifying said extracted digital content portion and information associated with said object model.

5. The method of claim 4, further comprising:
mapping a location of said extracted digital content portion within the body of the received electronic message based on said object model, wherein said modification and insertion is based on said mapping.

6. The method of claim 5, wherein said location is based on XPath information associated with the extracted digital content portion.

7. The method of claim 1, wherein said modification of the extracted digital content portion comprises modifying Hypertext Markup Language (HTML) information that corresponds to said extracted digital content portion.

8. The method of claim 1, wherein the altering of the visual characteristics of the retrieved portion comprises highlighting the retrieved portion.

9. The method of claim 1, wherein said sender is a third party entity, said digital content included in the received electronic message is proprietary to said third party entity, and said extracted digital content portion is specifically generated content by the third party entity for the user.

10. The method of claim 1, further comprising:
causing communication, over a network, of information related to said extracted digital content portion to a third party platform to obtain a digital content item comprising third party provided digital content associated with said information;
receiving, over the network, said digital content item; and
communicating said digital content item to said user for display in association with the second modified electronic message.

11. A non-transitory computer-readable storage medium tangibly encoded with computer-executable instructions, that when executed by a processor associated with a messaging server, performs a method comprising:
receiving, at the messaging server, an electronic message addressed to an inbox of a user sent by a sender, the electronic message comprising digital content within a body of the message;
identifying, via the messaging server, an object model associated with said electronic message;
analyzing, via the messaging server, said electronic message based on said object model, and based on said analysis, determining a portion of said digital content, said portion comprising pertinent information corresponding to a context of said electronic message;
extracting, via the messaging server, said digital content portion, said extraction comprising modifying the electronic message by removing the digital content portion and storing the removed portion in storage, the modified electronic message being a first modified electronic message;
delivering, via the messaging server, said first modified electronic message to said inbox, said delivery causing the first modified electronic message to be displayed within a portion of a user interface (UI) of said inbox as an unopened message;
receiving, via the messaging server, a request to open the first modified electronic message;
retrieving, via the messaging server, in response to the request and prior to opening the first modified electronic message, the removed portion from the storage;
modifying, via the messaging server, the retrieved portion by altering visual characteristics of the retrieved portion that correspond to the context;
inserting, via the messaging server, the modified portion into the first modified electronic message based on the object model, said insertion causing a creation of a second modified electronic message; and
causing, via the message server, in response to the request to open the first modified electronic message, the second modified electronic message to be opened and displayed within the inbox UI.

12. The non-transitory computer-readable storage medium of claim 11, further comprising:
receiving input associated with the displayed unopened message to open the displayed unopened message, wherein said caused display of the second modified electronic message is based on said received input.

13. The non-transitory computer-readable storage medium of claim 11, further comprising:
storing, in a datastore associated with said messaging server, said extracted digital content portion and information associated with said object model, said extracted digital content portion and information associated with said object model being stored in association with each other and an identifier of the received electronic message;
searching said datastore for said extracted digital content portion and information associated with said object model based on said identifier; and
identifying said extracted digital content portion and information associated with said object model.

14. The non-transitory computer-readable storage medium of claim 13, further comprising:
mapping a location of said extracted digital content portion within the body of the received electronic message based on said object model, wherein said modification and insertion is based on said mapping.

15. The non-transitory computer-readable storage medium of claim 11, wherein said sender is a third party entity, said digital content included in the received electronic message is proprietary to said third party entity, and said extracted digital content portion is specifically generated content by the third party entity for the user.

16. A messaging server comprising:
a processor; and
a non-transitory computer-readable storage medium for tangibly storing thereon program logic for execution by the processor, the program logic comprising:
logic executed by the processor for receiving, at the messaging server, an electronic message addressed to an inbox of a user sent by a sender, the electronic message comprising digital content within a body of the message;

logic executed by the processor for identifying, via the messaging server, an object model associated with said electronic message;

logic executed by the processor for analyzing, via the messaging server, said electronic message based on said object model, and based on said analysis, determining a portion of said digital content, said portion comprising pertinent information corresponding to a context of said electronic message;

logic executed by the processor for extracting, via the messaging server, said digital content portion, said extraction comprising modifying the electronic message by removing the digital content portion and storing the removed portion in storage, the modified electronic message being a first modified electronic message;

logic executed by the processor for delivering, via the messaging server, said first modified electronic message to said inbox, said delivery causing the first modified electronic message to be displayed within a portion of a user interface (UI) of said inbox as an unopened message;

logic executed by the processor for receiving, via the messaging server, a request to open the first modified electronic message;

logic executed by the processor for retrieving, via the messaging server, in response to the request and prior to opening the first modified electronic message, the removed portion from the storage;

logic executed by the processor for modifying, via the messaging server, the retrieved portion by altering visual characteristics of the retrieved portion that correspond to the context;

logic executed by the processor for inserting, via the messaging server, the modified portion into the first modified electronic message based on the object model, said insertion causing a creation of a second modified electronic message; and logic executed by the processor for causing, via the message server, in response to the request to open the first modified electronic message, the second modified electronic message to be opened and displayed within the inbox UI.

* * * * *